US012281770B2

(12) United States Patent
Giraud

(10) Patent No.: US 12,281,770 B2
(45) **Date of Patent: *Apr. 22, 2025**

(54) LUMINOUS MODULE THAT IMAGES THE ILLUMINATED SURFACE OF A COLLECTOR

(71) Applicant: VALEO VISION, Bobigny (FR)

(72) Inventor: Sylvain Giraud, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,709

(22) Filed: Jun. 8, 2023

(65) Prior Publication Data

US 2023/0313961 A1 Oct. 5, 2023

Related U.S. Application Data

(60) Continuation of application No. 17/650,653, filed on Feb. 10, 2022, now Pat. No. 11,719,406, which is a (Continued)

(30) Foreign Application Priority Data

Jul. 31, 2018 (FR) ...................................... 1857160

(51) Int. Cl.

*F21S 41/40* (2018.01)
*F21S 41/148* (2018.01)

(Continued)

(52) U.S. Cl.

CPC ............ *F21S 41/40* (2018.01); *F21S 41/148* (2018.01); *F21S 41/26* (2018.01); *F21S 41/321* (2018.01);

(Continued)

(58) Field of Classification Search

CPC ...... F21S 41/365; F21S 41/141; F21S 41/147; F21S 41/148; F21S 41/321

See application file for complete search history.

(56) References Cited

U.S. PATENT DOCUMENTS 8,419,247 B2 * 4/2013 Uchida .................. F21S 41/43 362/512
10,851,959 B2 12/2020 Iwasaki (Continued)

FOREIGN PATENT DOCUMENTS

CN 103900004 A 7/2014
CN 104204659 A 12/2014

(Continued)

OTHER PUBLICATIONS

International Search Report issued in PCT/EP2019/052670 on Mar. 1, 2019.

(Continued)

*Primary Examiner* — Matthew J. Peerce

(74) *Attorney, Agent, or Firm* — Oblon, McClelland, Maier & Neustadt, L.L.P.

(57) ABSTRACT

The invention relates to a light module, in particular for a motor vehicle, comprising a light source capable of emitting light rays; a collector with a reflective surface configured to collect and reflect the light rays emitted by the light source into a light beam along an optical axis of the module; an optical system configured to project the light beam. The collector is configured so that a portion of the light rays of the light beam are parallel to the optical axis or have an angle of inclination α smaller than or equal to 25° in a vertical plane with respect to said axis; and the optical system is configured to form an image of the reflective surface of the collector. The invention also relates to a light device comprising one or more such light modules.

35 Claims, 11 Drawing Sheets

Related U.S. Application Data division of application No. 17/264,532, filed as application No. PCT/EP2019/052670 on Feb. 4, 2019, now Pat. No. 11,280,464.

(51) Int. Cl.

| | |
|---|---|
| ***F21S 41/26*** | (2018.01) |
| ***F21S 41/32*** | (2018.01) |
| ***F21S 41/365*** | (2018.01) |
| ***F21S 43/14*** | (2018.01) |
| ***F21S 43/20*** | (2018.01) |
| ***F21S 43/31*** | (2018.01) |

(52) U.S. Cl.

CPC ............ *F21S 41/365* (2018.01); *F21S 43/14* (2018.01); *F21S 43/20* (2018.01); *F21S 43/31* (2018.01)

(56) References Cited

U.S. PATENT DOCUMENTS

| | | | | |
|---|---|---|---|---|
| 10,895,357 | B2 * | 1/2021 | Ishida | F21S 41/255 |
| 11,022,266 | B2 | 6/2021 | Hermitte | |
| 2010/0046243 | A1 | 2/2010 | Yatsuda | |
| 2015/0023045 | A1 | 1/2015 | Bauer et al. | |
| 2015/0043237 | A1 | 2/2015 | Kang | |
| 2015/0138822 | A1 * | 5/2015 | Tatsukawa | F21S 41/148<br>362/516 |
| 2016/0003437 | A1 | 1/2016 | Sakashita et al. | |
| 2016/0341386 | A1 | 11/2016 | Iha et al. | |
| 2017/0146209 | A1 | 5/2017 | Okubo | |
| 2019/0346107 | A1 | 11/2019 | Lu et al. | |

FOREIGN PATENT DOCUMENTS

| | | | |
|---|---|---|---|
| CN | 105917163 | A | 8/2016 |
| CN | 106152003 | A | 11/2016 |
| CN | 107763566 | A | 3/2018 |
| CN | 107893967 | A | 4/2018 |
| CN | 108050482 | A | 5/2018 |
| CN | 207501057 | U | 6/2018 |
| CN | 108291704 | A | 7/2018 |
| CN | 207584664 | U | 7/2018 |
| CN | 109282234 | A | 1/2019 |
| CN | 111692568 | A | 9/2020 |
| DE | 10 2016 118 152 | A1 | 3/2018 |
| EP | 1 798 467 | A1 | 6/2007 |
| EP | 1 970 619 | A1 | 9/2008 |
| EP | 3 144 584 | A1 | 3/2017 |
| EP | 3 301 350 | A1 | 4/2018 |
| FR | 3 038 695 | A1 | 1/2017 |
| JP | 2008-293958 | A | 12/2008 |
| JP | 2015-511057 | A | 4/2015 |
| JP | 2015-216056 | A | 12/2015 |
| WO | WO 2013/138834 | A1 | 9/2013 |
| WO | WO 2014/207817 | A1 | 12/2014 |

OTHER PUBLICATIONS

Combined Chinese Office Action and Search Report issued Sep. 30, 2022, in corresponding Chinese Patent Application No. 201980050549.2 (with English Translation and English Translation of Category of Cited Documents), 19 pages.

Office Action issued Oct. 7, 2022, in corresponding Japanese Patent Application No. 2021-505397 (with English Summary Translation), 22 pages.

Combined Chinese Office Action and Search Report issued Oct. 10, 2023, in corresponding Chinese Patent Application No. 201980050549.2 (with English Translation), 23 pages.

Combined Chinese Office Action and Search Report issued Mar. 25, 2024, in corresponding Chinese Patent Application No. 201980050549.2 (with English Translation and English Translation of Category of Cited Documents), 21 pages.

European Office Action issued Aug. 8, 2024 in European Patent Application No. 19701895.5, 38 pages.

* cited by examiner

LUMINOUS MODULE THAT IMAGES THE ILLUMINATED SURFACE OF A COLLECTOR

CROSS-REFERENCE TO RELATED APPLICATIONS

This application is a continuation of U.S. application Ser. No. 17/650,653 filed Feb. 10, 2022, which is a division of U.S. application Ser. No. 17/264,532 filed Jan. 29, 2021 (now U.S. Pat. No. 11,280,464), the entire contents of each of which are incorporated herein by reference. U.S. application Ser. No. 17/264,532 is a 371 of International Application No. PCT/EP2019/052670 filed Feb. 4, 2019, and claims the benefit of priority from prior French Application No. 18 57160 filed Jul. 31, 2018.

BACKGROUND OF THE INVENTION

Field of the Invention

The invention relates to the field of luminous lighting and signaling, and more particularly to the field of motor vehicles.

Description of the Related Art

It is generally known practice to produce a lighting beam with cutoff using one or more light modules with a bender. Such a light module comprises, conventionally, a collector with a reflective surface whose revolution has an elliptical profile, in the form of a cap in a half-space delimited by a horizontal plane. An essentially point light source, of light-emitting diode type, is located at a first focal point of the reflective surface and shines into the half-space in the direction of said surface. The rays are thus reflected in a convergent manner toward a second focal point of the reflective surface. Another, generally planar, reflective surface with a cutoff edge at the level of the second focal point ensures an upward reflection of the rays which do not pass precisely through the second focal point, these rays then being refracted by a thick lens toward the bottom of the lighting beam. This reflective surface is commonly referred to as a "bender" in that it "bends" toward the top of the projecting lens those rays which would otherwise form an upper portion of the lighting beam.

Such a light module has the drawback of requiring a high precision in the positioning of the bender and of the cutoff edge. Thus, the projecting lens must be a thick lens because of its small focal length, this increasing its weight and complicating the production thereof, in particular as regards shrink marks. In addition, the collector has a certain height and, thus, a certain heightwise bulk.

BRIEF SUMMARY OF THE INVENTION

The objective of the invention is to mitigate at least one of the drawbacks of the aforementioned prior art. More particularly, the object of the invention is to provide a light module capable of forming a light beam, potentially with cutoff, which is compact and more economical to produce.

One subject of the invention is a light module, in particular for a motor vehicle, comprising a light source capable of emitting light rays; a collector with a reflective surface configured to collect and reflect the light rays emitted by the light source into a light beam along an optical axis of the module; an optical system configured to project the light beam; noteworthy in that the optical system is configured to form an image of the reflective surface of the collector.

According to one advantageous embodiment of the invention, the collector is configured so that the light rays of the light beam that are reflected from a rear portion of the reflective surface of the collector are parallel to the optical axis or have an angle of inclination smaller than or equal to 25°, preferably smaller than or equal to 10° in a vertical plane with respect to said axis. Advantageously, the rays in question correspond to at least 30%, preferably 40%, more preferably 50%, more preferably still 80%, of the light rays of the light beam. Advantageously, the rear portion of the reflective surface is a rear half of said surface.

According to one advantageous embodiment of the invention, the light source is configured to emit the light rays in a main direction between 65° and 115° with respect to the optical axis, preferably perpendicular to the optical axis. According to one variant, the light source may be associated with a dioptric part of lens type in order to modulate the distribution of light over the reflective surface of the collector and in particular to create variations in light intensity.

According to one advantageous embodiment of the invention, the reflective surface of the collector has a parabolic or elliptical profile. Preferably, it is a surface of revolution of said profile. The revolution is about an axis that advantageously is parallel to the optical axis. According to one variant, the reflective surface is a free-form surface or a swept surface or an asymmetric surface. It may also comprise a plurality of segments.

According to one advantageous embodiment of the invention, the optical system has a focal point located on the optical axis at the level of the light source, in front of or behind said source with respect to a general direction of propagation of the light beam along the optical axis.

According to one advantageous embodiment of the invention, the module further comprises a screen located in front of the light source, with respect to a general direction of propagation of the light beam along the optical axis, and facing the reflective surface of the collector, so as to collect the light rays emitted forward by the light source and not reflected by said surface.

According to one advantageous embodiment of the invention, the screen is opaque so as to absorb the collected light rays.

According to one advantageous embodiment of the invention, the optical system is a projecting lens.

According to one advantageous embodiment of the invention, the optical system comprises a mirror, advantageously on the optical axis.

According to one advantageous embodiment of the invention, the mirror of the optical system is a first mirror, said system comprising a second mirror behind the first mirror, with respect to a general direction of propagation of the light beam, and at a distance from said axis, the first mirror being configured to reflect the light beam toward the second mirror, and the second mirror being configured to reflect said beam reflected by the first mirror, in a direction substantially parallel to the optical axis.

According to one advantageous embodiment of the invention, the first mirror is planar or has a concave profile in a horizontal plane when the module is oriented in the mounted position.

According to one advantageous embodiment of the invention, the mirror or the second mirror has a parabolic profile in a vertical plane when the module is oriented in the mounted position.

According to one advantageous embodiment of the invention, the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position.

According to one advantageous embodiment of the invention, the light rays reflected by the reflective surface along the rear edge are parallel to the optical axis or have an angle of inclination smaller than or equal to 25°, preferably smaller than or equal to 10° in a vertical plane with respect to said optical axis.

According to one advantageous embodiment of the invention, the reflective surface of the collector comprises two lateral edges on either side of the optical axis and in the continuation of the rear edge, said lateral edges being in a horizontal plane when the module is oriented in the mounted position.

According to one advantageous embodiment of the invention, the rear edge is in the horizontal plane, the light image formed having a corresponding flat horizontal cutoff.

According to one advantageous embodiment of the invention, the rear edge has a kink, the light image formed having a corresponding kinked horizontal cutoff.

According to one advantageous embodiment of the invention, the reflective surface of the collector comprises two lateral edges on either side of the optical axis, said lateral edges intersecting with the rear edge, the light image formed having corresponding lateral cutoffs.

Another subject of the invention is a light device for a motor vehicle, comprising a plurality of light modules combined so as to form, together, a lighting and/or signaling beam; noteworthy in that at least one of the modules is according to the invention.

According to one advantageous embodiment of the invention, for at least one of the light modules, the reflective surface of the collector comprises two lateral edges on either side of the optical axis and in the continuation of the rear edge, said lateral edges being in a horizontal plane when the module is oriented in the mounted position, the rear edge is in the horizontal plane, the light image formed having a corresponding flat horizontal cutoff, and for at least one other of said modules the reflective surface of the collector comprises two lateral edges on either side of the optical axis and in the continuation of the rear edge, said lateral edges being in a horizontal plane when the module is oriented in the mounted position, the rear edge has a kink, the light image formed exhibiting a corresponding kinked horizontal cutoff, the lighting beam having a kinked horizontal cutoff.

According to one advantageous embodiment of the invention, the at least one light module numbers at least two, the optical system of each of said modules being common.

According to one advantageous embodiment of the invention, the common optical system has a focal point located behind, with respect to a general direction of propagation of the light beam, the collectors of the light modules that number at least two.

The measures of the invention are advantageous in that imaging the illuminated reflective surface of the collector makes it possible to obtain a sharp projected light image and, therefore, to achieve equally sharp cutoffs by means of the edges of the surface in question. More particularly, the edges of the reflective surface, in particular the rear edge, have dimensions that are substantially larger (for example between 15 and 20 mm) than the cutoff edge (for example 5 mm) of a light module with a bender of the prior art, which makes the light module substantially less sensitive with respect to the positioning tolerances of the optical elements, in particular the light source with respect to the collector, and therefore substantially more robust.

In addition, the fact of being under Gaussian conditions, namely rays that are inclined little with respect to the optical axis and are not far from said axis, has the consequence that the lens forming the projecting system may be a thin lens, for example with a thickness of less than 6 mm, which allows it to be produced in a single plastic injection.

BRIEF DESCRIPTION OF THE SEVERAL VIEWS OF THE DRAWINGS

Other features and advantages of the present invention will be better understood with the aid of the description and the drawings, in which.

DETAILED DESCRIPTION OF THE INVENTION

FIGS. 1 to 4 illustrate a first embodiment of a light module according to the invention.

Figure 1:
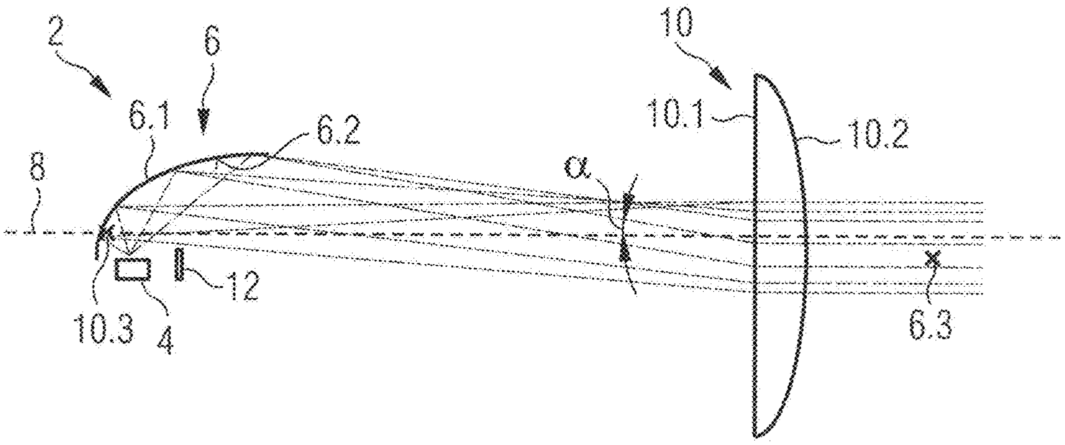
FIG. 1 is a schematic representation of a light module according to a first embodiment of the invention.

FIG. 1 is a schematic representation of the light module and of its operating principle. The light module 2 essentially comprises a light source 4, a collector 6 capable of reflecting the light rays emitted by the light source in order to form a light beam along an optical axis 8 of the module, and a lens 10 for projecting said beam. Optical projecting systems other than the projecting lens are envisageable, such as in particular one or more mirrors, as in FIGS. 16 and 17.

The light source 4 is advantageously a semiconductor light source, and in particular a light-emitting diode. The light source 4 emits light rays in a half-space delimited by the main plane of said source, in the example shown in a main direction perpendicular to said plane and to the optical axis 8. According to the invention, the main direction of emission will be able to be between 65° and 115° with respect to the optical axis 8.

The collector 6 comprises a carrier 6.1, of shell or cap shape, and a reflective surface 6.2 on the inner face of the carrier 6.1. The reflective surface 6.2 advantageously has a profile of elliptical or parabolic type. It is advantageously a surface of revolution about an axis parallel to the optical axis. Alternatively, it may be a free-form surface or a swept surface or an asymmetric surface. It may also comprise a plurality of segments. The shell- or cap-shaped collector 6 is advantageously made from materials exhibiting good heat resistance, for example of glass or of synthetic polymers such as polycarbonate PC or polyetherimide PEI. The expression "parabolic type" generally applies to reflectors whose surface has a single focal point, i.e. one region of convergence of the light rays, i.e. one region such that the light rays emitted by a light source placed in this region of convergence are projected to a great distance after reflection from the surface. Projected to a great distance means that these light rays do not converge toward a region located at at least 10 times the dimensions of the reflector. In other words, the reflected rays do not converge toward a region of convergence or, if do they converge, this region of convergence is located at a distance greater than or equal to 10 times the dimensions of the reflector. A parabolic surface may therefore feature or not feature parabolic segments. A reflector having such a surface is generally used alone to create a light beam. Alternatively, it may be used as projecting surface associated with an elliptical-type reflector. In this case, the light source of the parabolic-type reflector is the region of convergence of the rays reflected by the elliptical-type reflector.

The light source 4 is arranged at a focal point of the reflective surface 6.2 such that its rays are collected and reflected along the optical axis. At least some of these reflected rays have angles of inclination $\alpha$ in a vertical plane with respect to said axis that are smaller than or equal to 25°, and preferably smaller than or equal to 10°, so as to be under what are called Gaussian conditions, allowing a stigmatism, i.e. a sharpness of the projected image, to be obtained. Advantageously, these rays are reflected by the rear portion of the reflective surface 6.2.

The projecting lens 10 is advantageously a plano-convex lens, that is to say with a planar entrance face 10.1 and a convex exit face 10.2. The lens 10 is referred to as thin, for example less than 6 mm, due to the low inclination of the rays to be deflected. The lens 10 has a focal point 10.3 which is located along the optical axis 8, at the level of the light source 4 or behind said source. In this case, the focal point 10.3 is located at the level of the reflective surface 6.2 of the collector 6. It should be noted that it is also possible for this focal point to be located behind or in front of the reflective surface 6.2 provided that it is in proximity, and preferably within less than 10 mm, and preferably less than 5 mm, thereto.

The reflective surface, if it is of elliptical type, has a second focal point 6.3 located in front of the lens 10 and at a distance from the optical axis 8. It should be noted that it is also possible for this focal point to be located behind the lens and/or on the optical axis, provided that it is in proximity to the lens, so as to decrease the width of the beam on the entrance face of the lens.

The light module 2 may comprise a screen 12 arranged in front of the light source 4 and facing the reflective surface 6.2 of the collector 6, so as to collect the light rays emitted by the source in question 4 that do not encounter the reflective surface 6.2. Such a measure is useful for avoiding the presence of parasitic light rays which might participate in the formation of the light beam without however being strictly speaking imaged. These rays will then potentially light an upper portion of the light beam, which is not desirable in the case of a lighting beam with cutoff. The screen is advantageously opaque in order to absorb these rays, it being understood that it is also possible to envisage reflecting them toward a distal absorption region.

Figure 2:
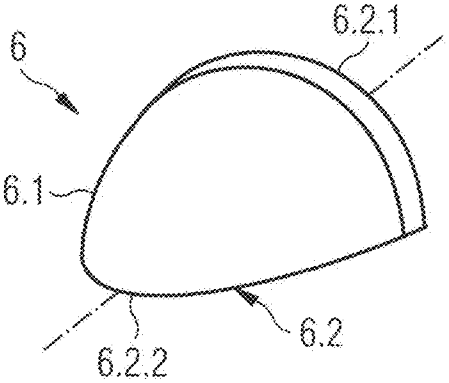
FIG. 2 is a perspective view of the collector of the light module of FIG. 1.

FIG. 2 is a rear perspective view of the collector 6 of the light module 2 of FIG. 1. The shell or cap shape of the carrier 6.1 and the fact that the reflective surface (not shown) has a front edge 6.2.1 and a rear edge 6.2.2 may be seen. On account of the fact that the carrier 6.1 and, therefore, the reflective surface 6.2 form a symmetric shell of revolution delimited by a plane, the plane in question comprises the rear edge 6.2.2. The latter lies in this plane laterally on either side of the axis of revolution. When the reflective surface 6.2 is lit by the light source, the entirety of the surface thereof is then illuminated, said surface being delimited by the front edge 6.2.1 and rear edge 6.2.2.

Figure 3:
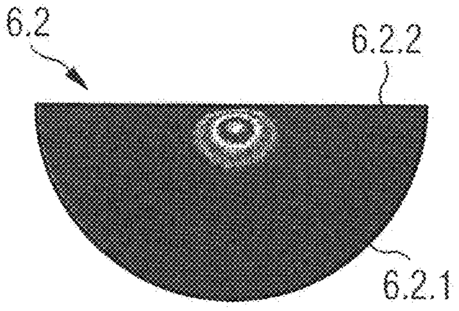
FIG. 3 is a view of the inner surface of the collector of the light module of FIG. 1, from the outside along the optical axis.

FIG. 3 is a representation of the light intensity on the reflective surface 6.2 seen from the outside, along the optical axis. More specifically, it is the irradiance of the surface, namely the power per unit area of the electromagnetic radiation incident perpendicular to the direction of said surface, expressed in $W/m^2$. The dark region covering most of the surface corresponds to lower irradiances whereas the lighter central region corresponds to higher irradiances. It may be seen that the dark region is clearly delimited by the edges 6.2.1 and 6.2.2. In other words, the lit surface 6.2 naturally has sharp edges capable of forming cutoffs in the projected lighting beam imaging this surface.

Figure 4:
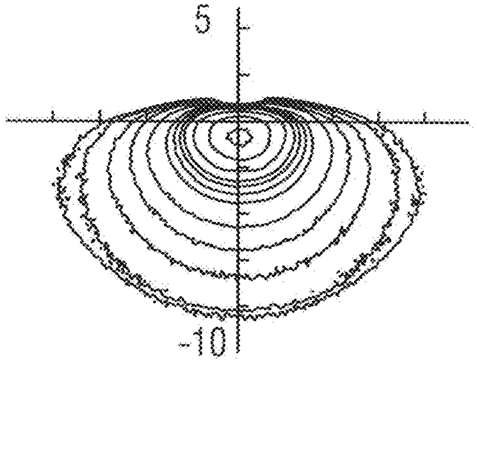
FIG. 4 is a graphical representation of the light image of the lighting beam produced by the light module of FIG. 1.

FIG. 4 is a graphical representation of the image projected by the light module of FIG. 1. The horizontal axis and the vertical axis cross on the optical axis of the light module. The curves are isolux curves, i.e. curves corresponding to regions of the light beam in which the luminance expressed in lux is the same. The curves at the center correspond to a higher luminance level than on the periphery. It may be seen that the light beam produced has a horizontal cutoff, essentially level with the horizontal axis. The cutoff is not perfectly straight; it has a curvature that corresponds to aberrations in the image thus produced. In any case, the horizontal cutoff is produced by the edge 6.2.2 (FIG. 3), which is the rear edge (FIG. 2) of the reflective surface 6.2 of the collector 6. It may also be seen that the produced light beam has, under the horizontal axis, a sharp outline corresponding to the front edge 6.2.1.

FIGS. 5 to 8 illustrate a second embodiment of a light module according to the invention. The reference numbers of the first embodiment of the light module (FIGS. 1 to 4) are used to designate the same elements or corresponding elements, these numbers however being increased by 100. Reference is additionally made to the description of these elements in relation to FIGS. 1 to 4.

The second embodiment is similar to the first embodiment and differs from it essentially in that the rear edge 106.2.2 of the reflective surface 106.2 has a kink and, more generally, the wall forming the carrier 106.1 of the collector and the reflective surface 106.2 of said collector extend less downward in the direction of the light source 104. In other words, the rear edge 106.2.2 not only has a kink but is also closer to the optical axis 108. This is due to the desired beam geometry where maximum intensity is at the level of the optical axis 108. In another configuration of the collector, it is possible for the rear edge not to be closer to the optical axis. The rest is essentially identical to the first embodiment of the light module.

Figure 5:
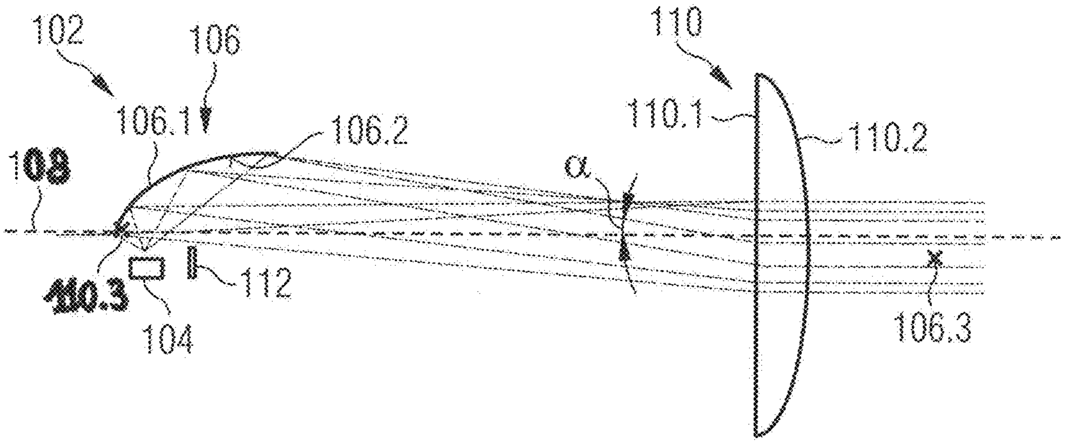
FIG. 5 is a schematic representation of a light module according to a second embodiment of the invention.

FIG. 5 is a schematic representation of the light module and of its operating principle, similar to FIG. 1. Similar to the first embodiment, optical projecting systems other than the projecting lens 110 are envisageable, such as in particular one or more mirrors, as in FIGS. 16 and 17. It may be seen that the collector 106 is shorter, that is to say extends less toward the light source 104.

Figure 6:
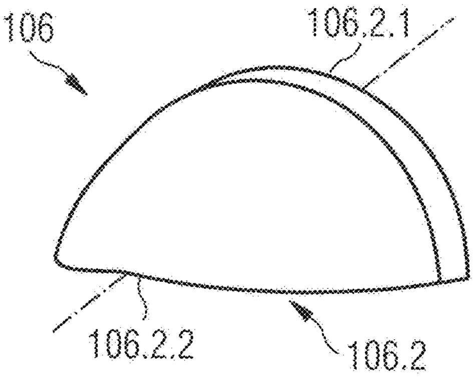
FIG. 6 is a perspective view of the collector of the light module of FIG. 5.

FIG. 6 is a rear perspective view of the collector 6 of the light module 102 of FIG. 5, similar to FIG. 2. It may be seen that the rear edge 106.2.2 of the reflective surface 106.2 of the collector 106 forms a kink at its intersection with a median vertical plane.

Figure 7:
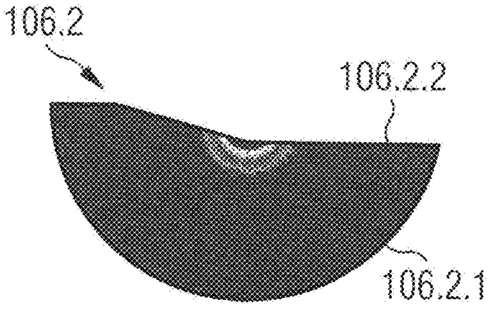
FIG. 7 is a view of the inner surface of the collector of the light module of FIG. 5, from the outside along the optical axis.

FIG. 7 is a representation of the light intensity of the reflective surface 106.2 seen from the outside, along the optical axis, similar to FIG. 3. The kink of the rear edge 106.2.2 may clearly be seen there.

Figure 8:
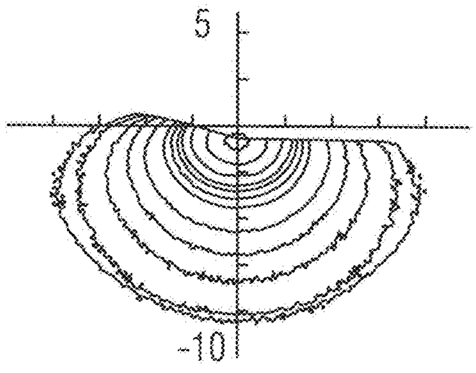
FIG. 8 is a graphical representation of the light image of the lighting beam produced by the light module of FIG. 5.

FIG. 8 is a graphical representation of the image projected by the light module of FIG. 5, similar to FIG. 4. The shape of the horizontal cutoff may be seen, corresponding to the profile of the rear edge 106.2.2 visible in FIGS. 6 and 7.

Figure 9:
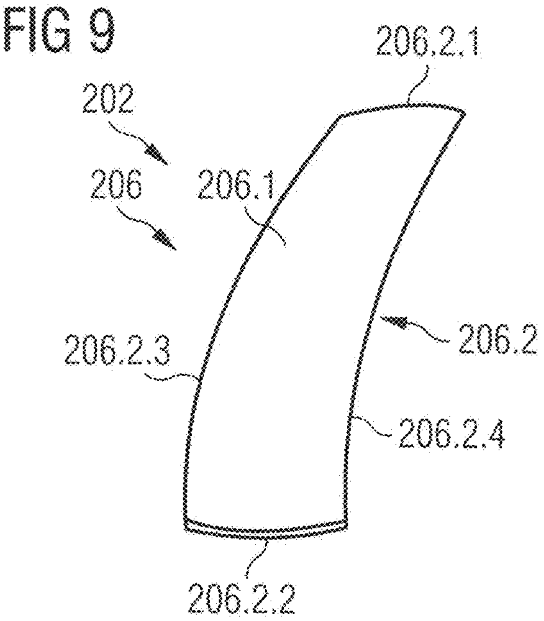
FIG. 9 is a perspective view of the collector of the light module according to a third embodiment of the invention.
Figure 10:
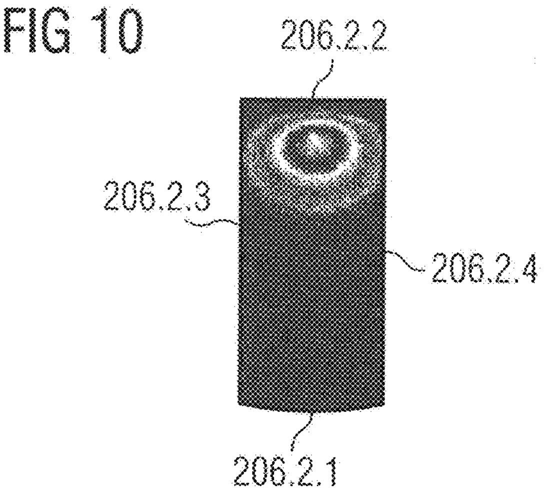
FIG. 10 is a view of the inner surface of the collector of the light module of FIG. 9, from the outside along the optical axis.
Figure 11:
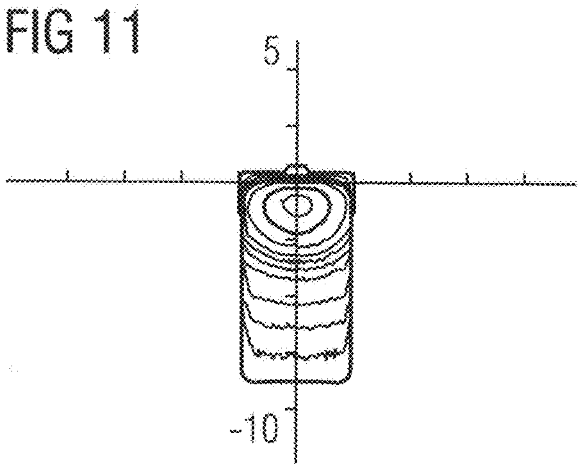
FIG. 11 is a graphical representation of the light image of the lighting beam produced by the light module of FIG. 9.

FIGS. 9 to 11 illustrate a third embodiment of a light module according to the invention. The reference numbers of the first embodiment of the light module (FIGS. 1 to 4) are used to designate the same elements or corresponding elements, these numbers however being increased by 200. Reference is additionally made to the description of these elements in relation to FIGS. 1 to 4.

This third embodiment differs from the previous two essentially in that the collector is truncated laterally, that is to say now forms only a portion of the shell such as in the first and second embodiments.

The architecture of the module and its operating principle is similar to that of the previous two embodiments.

FIG. 9 is a rear perspective view of the collector of the light module, similar to FIGS. 2 and 6. It may be seen that, unlike the first two embodiments, the rear edge 206.2.2 of the reflective surface 206.2 is limited in its lateral extension. In the invention, the reflective surface 206.2 has two lateral edges 206.2.3 and 206.2.4 that intersect with the rear edge 206.2.2 and with the front edge 206.2.1.

FIG. 10 is a representation of the light intensity of the reflective surface 206.2 seen from the outside, along the optical axis, similar to FIGS. 3 and 7. It is possible to see the four sharp edges corresponding to the front 206.2.1, rear 206.2.2 and lateral 206.2.3 and 206.2.4 edges.

FIG. 11 is a graphical representation of the image projected by the light module of the third embodiment, similar to FIGS. 4 and 8. It may be seen that the light image is cut off not only horizontally but also laterally, more particularly vertically.

FIGS. 12 to 15 illustrate a light device for a motor vehicle according to a first embodiment.

Figure 12:
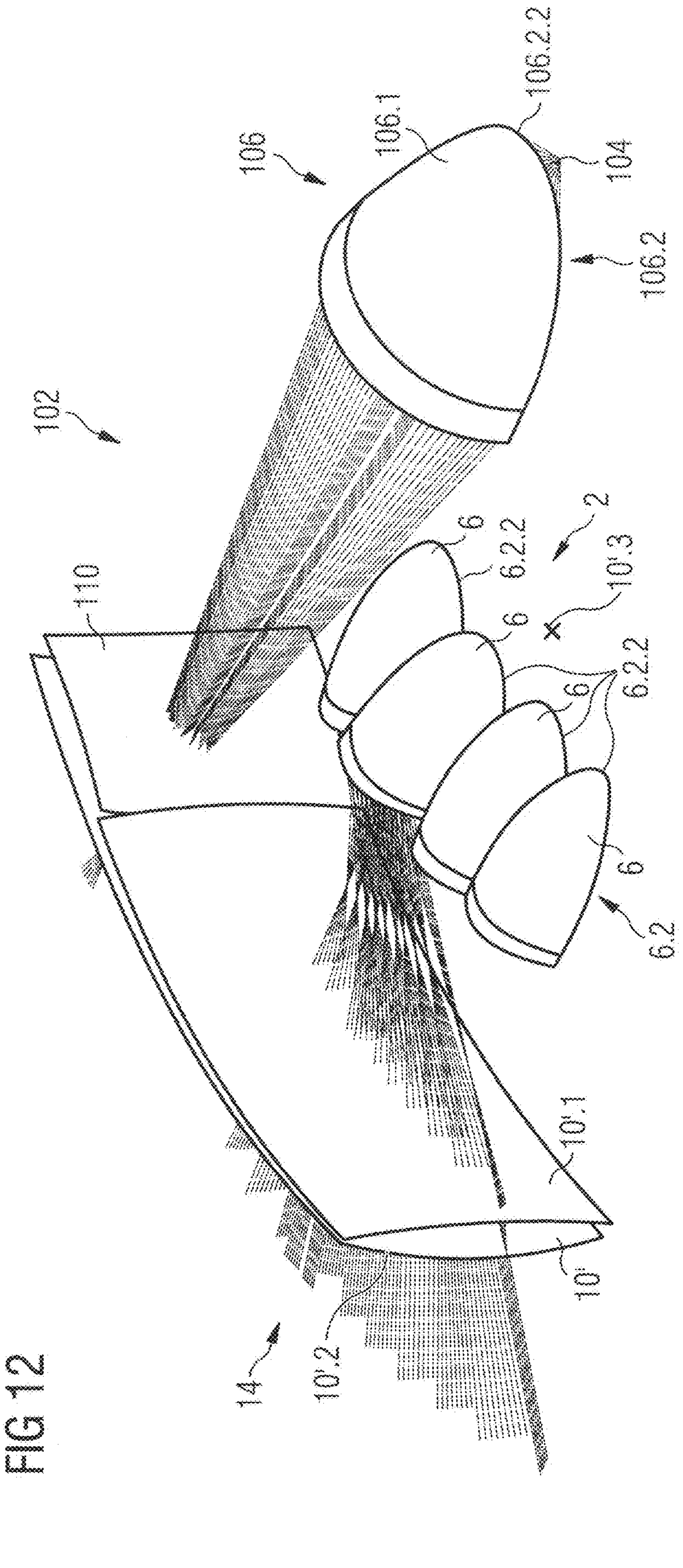
FIG. 12 is a perspective representation of a light device comprising light modules according to the invention, according to a first embodiment of the invention.
Figure 13:
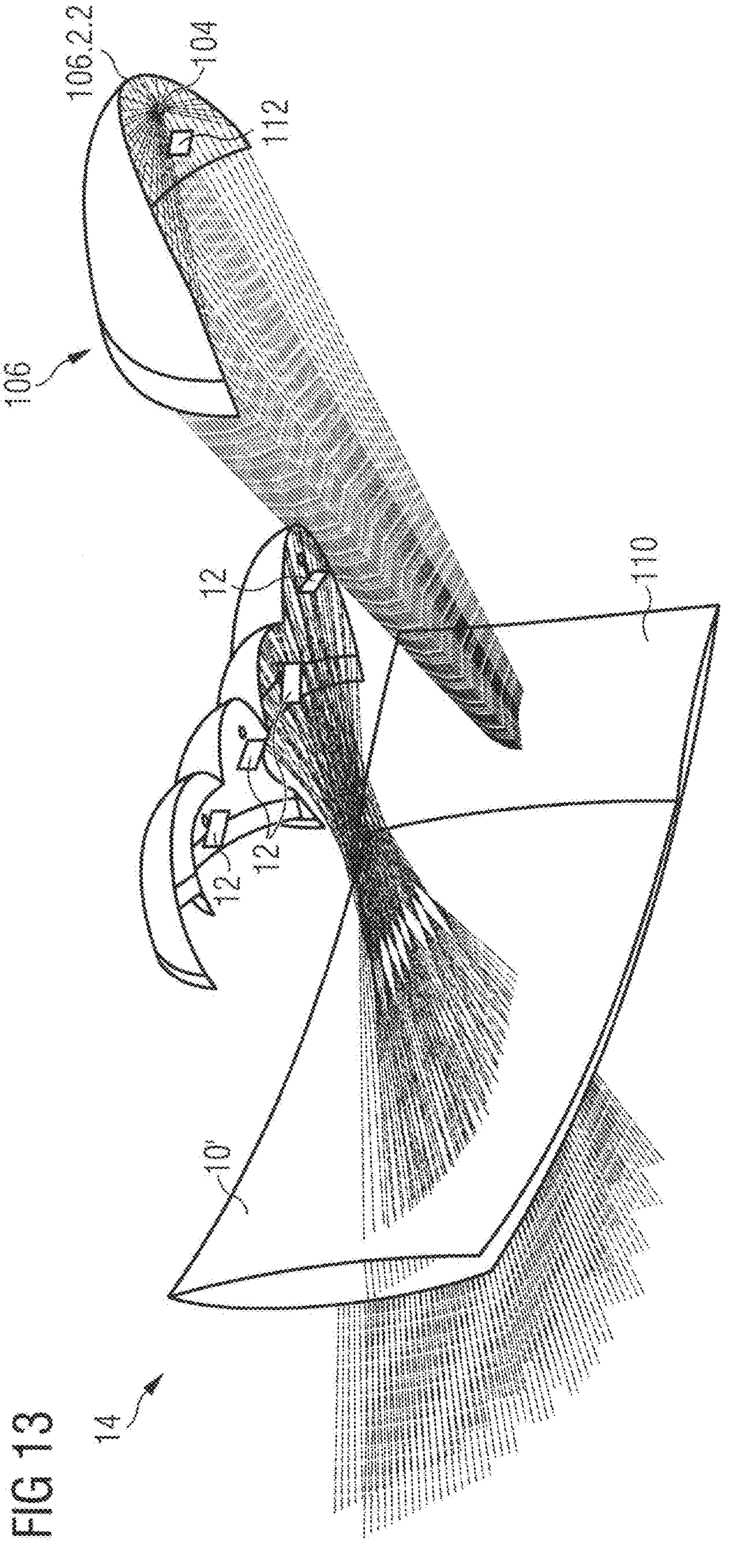
FIG. 13 is a perspective representation of the light device of FIG. 12, from another viewing direction.

FIGS. 12 and 13 are two perspective views of the light device. The light device 14 comprises a plurality of light modules in accordance with the invention which, combined, form a light beam of dipped or low-beam type, having a kinked horizontal cutoff.

More specifically, the light device 14 comprises a first light module 102 in accordance with that of FIGS. 5 to 8, that is to say a module with a kinked horizontal cutoff. Such a function is commonly referred to using the term “kink”.

The light device 14 also comprises four light modules 2 arranged side by side and in accordance with the light module of FIGS. 1 to 4, that is to say a module with a flat horizontal cutoff. Such a function is commonly referred to using the term “flat”. However, these light modules 2 have the particular feature that their projecting lenses form a common lens 10', in one piece. The common lens 10' has a generally curved horizontal profile and entrance 10'.1 and exit 10'.2 faces. It has a focal point line 10'.3 which is advantageously located behind the collectors 6, so as to image essentially the rear edge 6.2.2 of the reflective surfaces and thus produce a sharp horizontal (“flat”) cutoff. The lit reflective surfaces 6.2 of the collectors 6 are thus imaged essentially vertically but less horizontally in order to achieve horizontally diffuse illumination and thus ensure good homogeneity between the images of the light modules 2.

The projecting lens 110 of the light module 102 is advantageously distinct from the common lens 10. The focal point of the lens 10 is itself located in front of the rear edge 106.2.2 of the reflective surface 106.2 of the collector 106, so as to image said surface not only vertically but also horizontally and thus produce a sharp “kinked” cutoff.

A partition may be provided between the light module 102 and the light module 2 closest to said module 102, so as to allow them to be brought closer together without the light rays escaping from one of the modules interfering with the other. Such a partition extends essentially vertically when the lighting device is in the mounted position as illustrated in FIG. 12. It is advantageously light absorbent.

Figure 14:
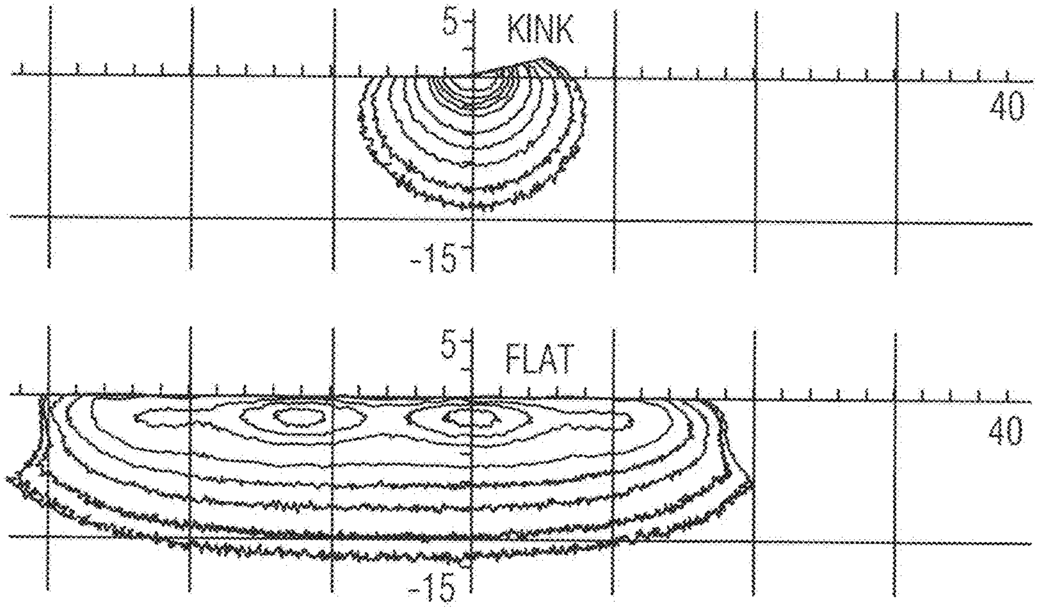
FIG. 14 is a graphical representation of the light image of the lighting beams that are produced by the module with a kink and modules with a flat cutoff, respectively, of the light device of FIGS. 12 and 13.

FIG. 14 illustrates the light images produced by the light module 102 (FIGS. 12 and 13) (“kink”) and the light modules 2 (“flat”). The upper light image is produced by the light module 102. It is very sharp and corresponds to the light image in FIG. 8.

The lower light image is produced by two of the four light modules 2 (FIGS. 12 and 13), namely those for which the ray paths are shown in FIGS. 12 and 13. A sharp horizontal cutoff and a homogeneous horizontal mixing of the light images of the two modules is clearly seen. It should be noted that the horizontal cutoff is here lower and particularly flat with respect to that which is visible in FIG. 4 of the first embodiment of the light module, since the reflective surfaces of the collectors have rear and lateral edges that are further away from the light sources, respectively, similar to the light module of FIGS. 5 to 8, the rear edge and the lateral edges then being in one and the same plane.

Figure 15:
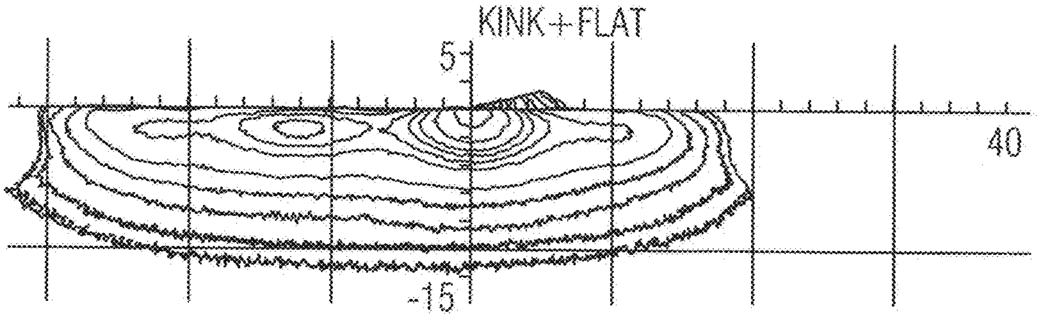
FIG. 15 is a graphical representation of the light image of the light device of FIGS. 12 and 13.

FIG. 15 illustrates the combined light image of the "kink" and "flat" images of FIG. 14. It is understood that the two other light modules 2 whose light ray paths are not shown in FIGS. 12 and 13 complete the light image on the right-hand side, similar to the image in FIG. 14 of the two light modules whose ray paths are shown.

FIGS. 16 to 19 illustrate a light device for a motor vehicle according to a second embodiment.

Figure 16:
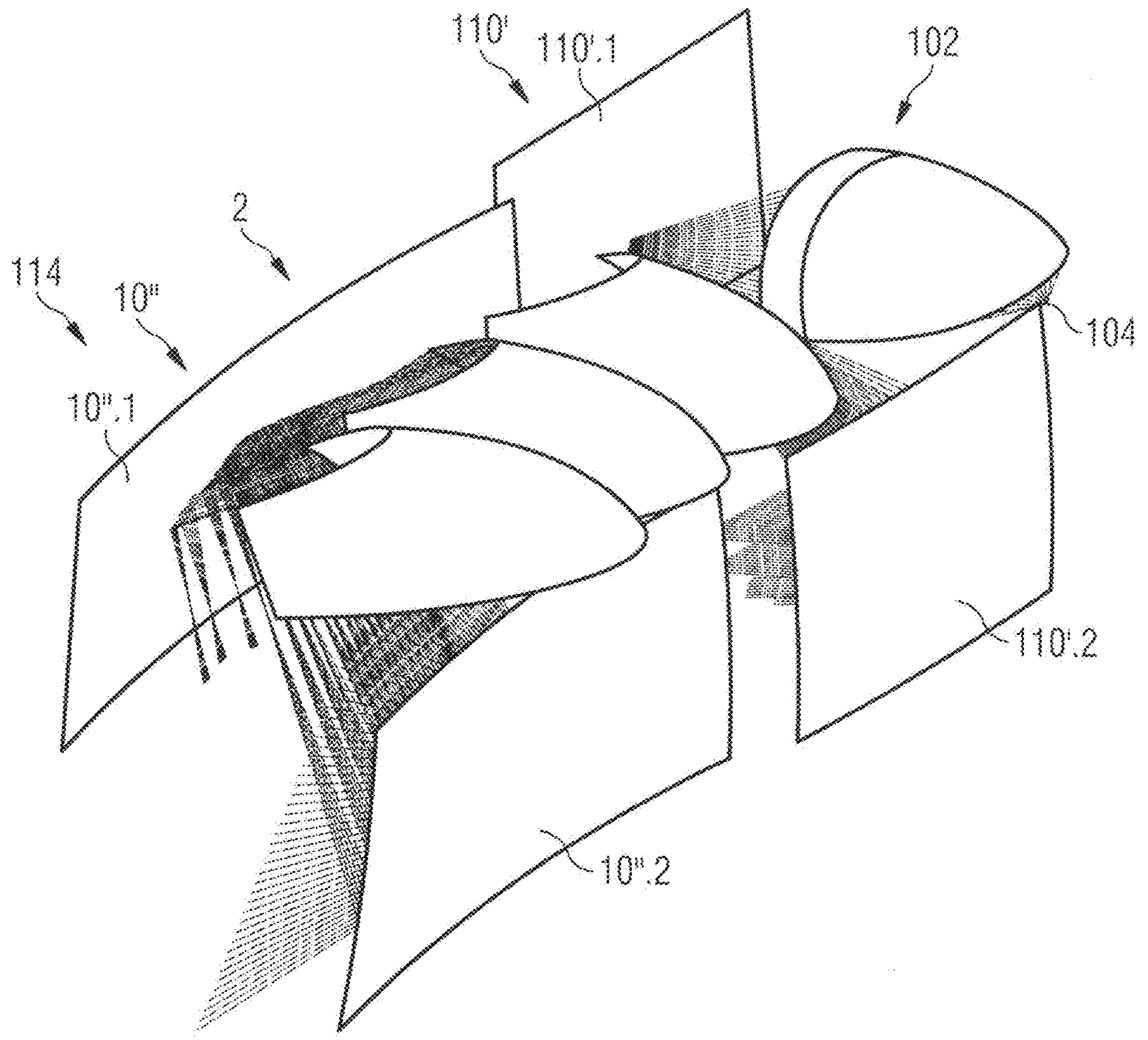
FIG. 16 is a perspective representation of a light device comprising light modules according to the invention, according to a second embodiment of the invention.
Figure 17:
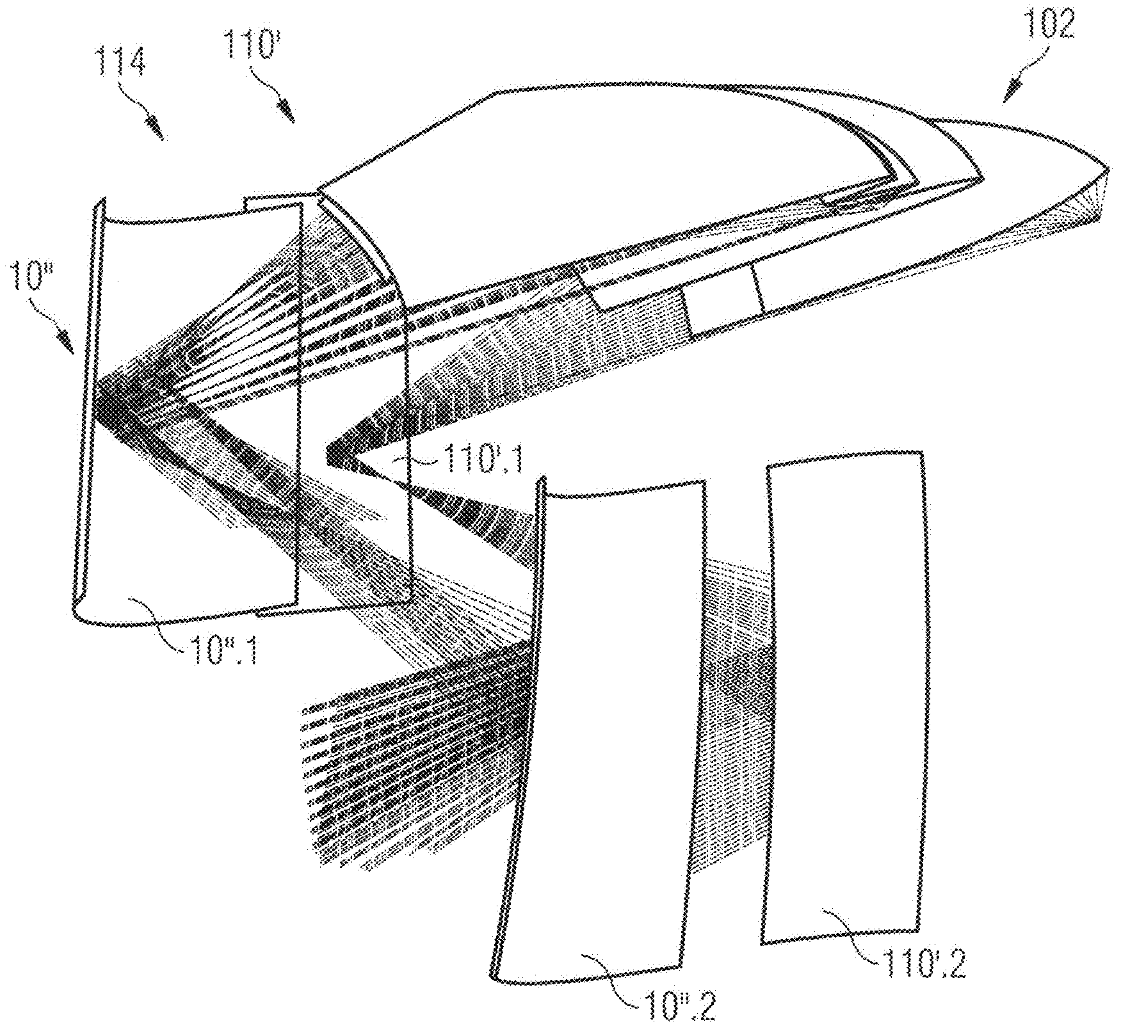
FIG. 17 is a perspective representation of the light device of FIG. 16, from another viewing direction.

FIGS. 16 and 17 are two perspective views of the light device. Similar to the light device of the first embodiment, the light device 114 comprises a first light module 102 in accordance with that of FIGS. 5 to 8, that is to say a module with a kinked horizontal cutoff. The light device 114 also comprises three light modules 2 arranged side by side and in accordance with the light module of FIGS. 1 to 4, that is to say a module with a flat horizontal cutoff.

The light device 114 is distinguished from the light device 14 of FIGS. 12 and 13 essentially in that the projecting lenses of the light modules 2 and 102 are replaced with mirrors.

More specifically, the module 102 comprises an optical projecting system 110' including a first mirror 110'.1 and a second mirror 110'.2. The first mirror 110'.1 may be planar or have a concave curved horizontal profile. It sends the rays emitted by the collector of the light module 102 to the second mirror 110'.2. This is configured to form an image of the lit reflective surface of the light module 102. For this purpose, the second mirror 110'.2 may have a concave parabolic vertical profile. Such a profile allows enlarged imaging of the lit reflective surface of the collector of the module 102. The second mirror 110'.2 may have a convex horizontal profile, in particular when the first mirror 110'.1 has a concave horizontal profile. The first and second mirrors which have just been described may be reversed. In this case, the light device will be more bulky, in particular longitudinally due to the fact that the first imaging mirror will have to be further forward.

Similar to the light module 102, the light modules 2 comprise an optical projecting system 10" provided with a first mirror 10"1 and a second mirror 10"2. The operating principle is identical to that of the optical system 110' described above. The observations presented above therefore also apply to the optical system 10".

Figure 18:
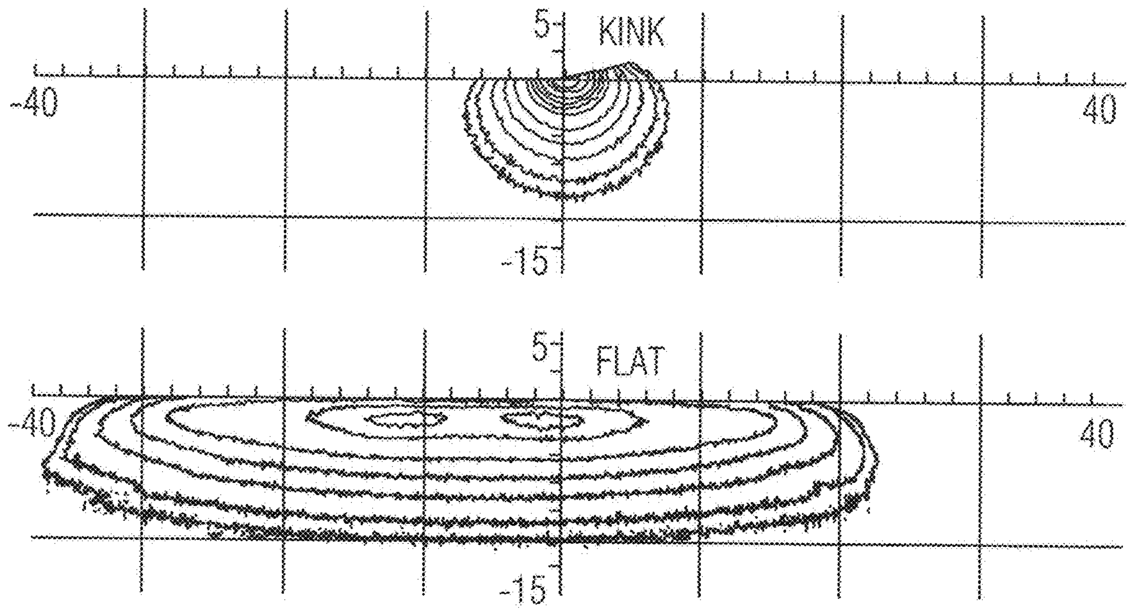
FIG. 18 is a graphical representation of the light image of the lighting beams that are produced by the module with a kink and modules with a flat cutoff, respectively, of the light device of FIGS. 16 and 17.

FIG. 18 illustrates the light images produced by the light module 102 ("kink") and the light modules 2 ("flat") of FIGS. 16 and 17. The observations made in relation to FIG. 14 of the first embodiment of the lighting device apply to FIG. 18.

Figure 19:
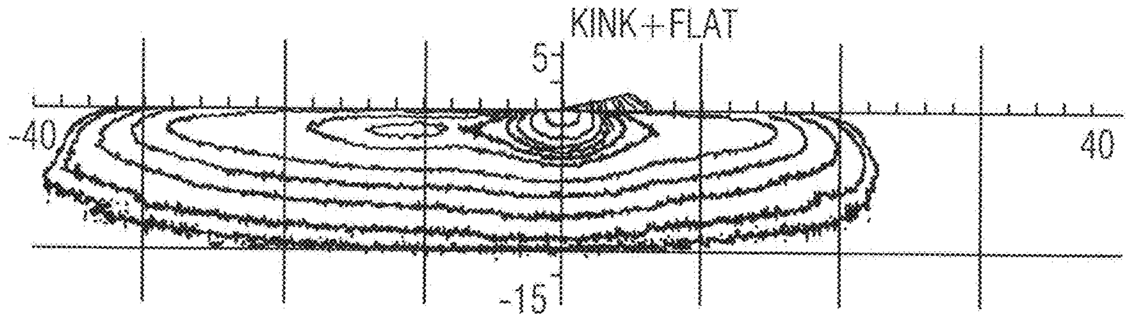
FIG. 19 is a graphical representation of the light image of the light device of FIGS. 16 and 17.

FIG. 19 illustrates the combined light image of the "kink" and "flat" images of FIG. 18. The observations made in relation to FIG. 15 of the first embodiment of the lighting device apply to FIG. 19.

Figure 20:
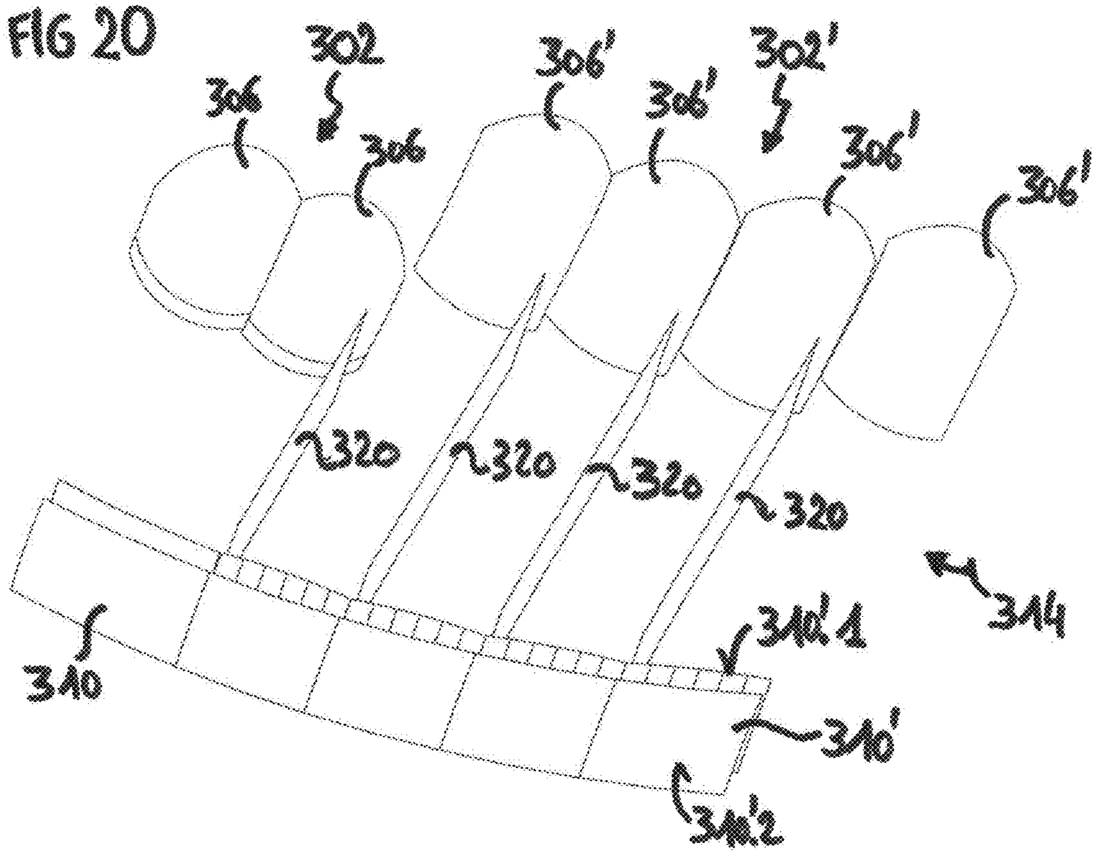
FIG. 20 is a perspective representation of a light device comprising light modules according to the invention, according to a third embodiment of the invention.

FIG. 20 illustrates a light device for a motor vehicle according to a third embodiment.

FIG. 20 is a front perspective view from above of the light device. The light device 314 comprises a plurality of light modules in accordance with the invention which, combined, form a lighting beam of high-beam type.

More specifically, the light device 314 comprises a first set of two light modules 302 similar to that of FIGS. 1 to 4, that is to say a module with a flat horizontal cutoff. However, their vertical orientation is reversed with respect to those of the first embodiment since most of the light from a beam of high-beam type is above the horizontal. The collectors 306 therefore have their cavity oriented upward according to the viewing angle of FIG. 20. The light sources have not been shown for the sake of simplicity. The function of this first set is to achieve the horizontal—or widthwise—spreading of the high beam. The light modules 302 have a common projecting lens 310.

The light device 314 also comprises a second set with four light modules 302' arranged side by side and similar to the light module of FIGS. 1 to 4, that is to say a module with a flat horizontal cutoff, again rotated 180° vertically. The collectors 306' therefore have their cavity oriented upward according to the viewing angle of FIG. 20. The function of this second set is to produce the frontal range of the high beam, that is to say the central region which has the maximum intensity. However, these light modules 302' have the particular feature that their projecting lenses form a common lens 310', in one piece. The common lens 310' has a generally curved horizontal profile and entrance 310'.1 and exit 310'.2 faces. The entrance face 310'.1 here exhibits structuring in order to improve the homogeneity of the light beam.

A partition 320 may be provided between the light module 302 and the light module 302' closest to said module 302, so as to allow them to be brought closer together without the light rays escaping from one of the modules interfering with the other. Such a partition 320 extends essentially vertically when the lighting device is in the mounted position as illustrated. It is advantageously light absorbent.

Figure 21:
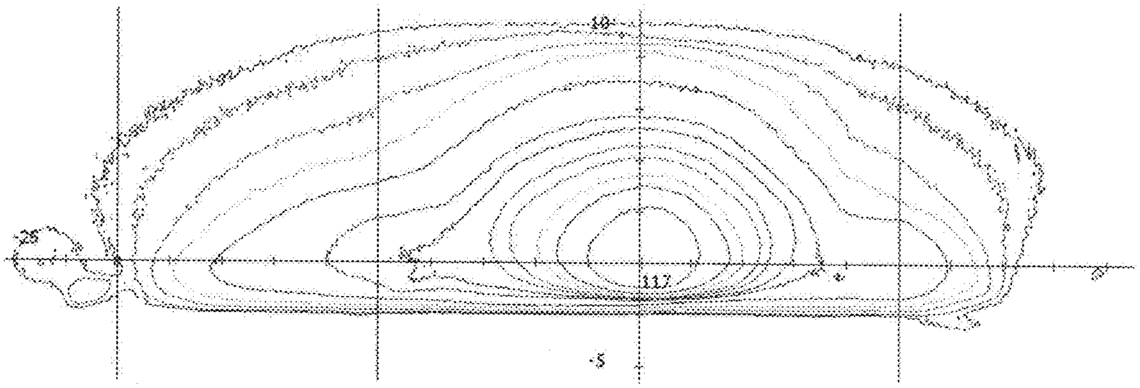
FIG. 21 is a graphical representation of the light image of the light device of FIG. 20.

FIG. 21 illustrates the combined light image of the images of the collectors 302 and 302' of FIG. 20, when all of light sources are on. A high-beam distribution is easily recognized there.

Figure 22:
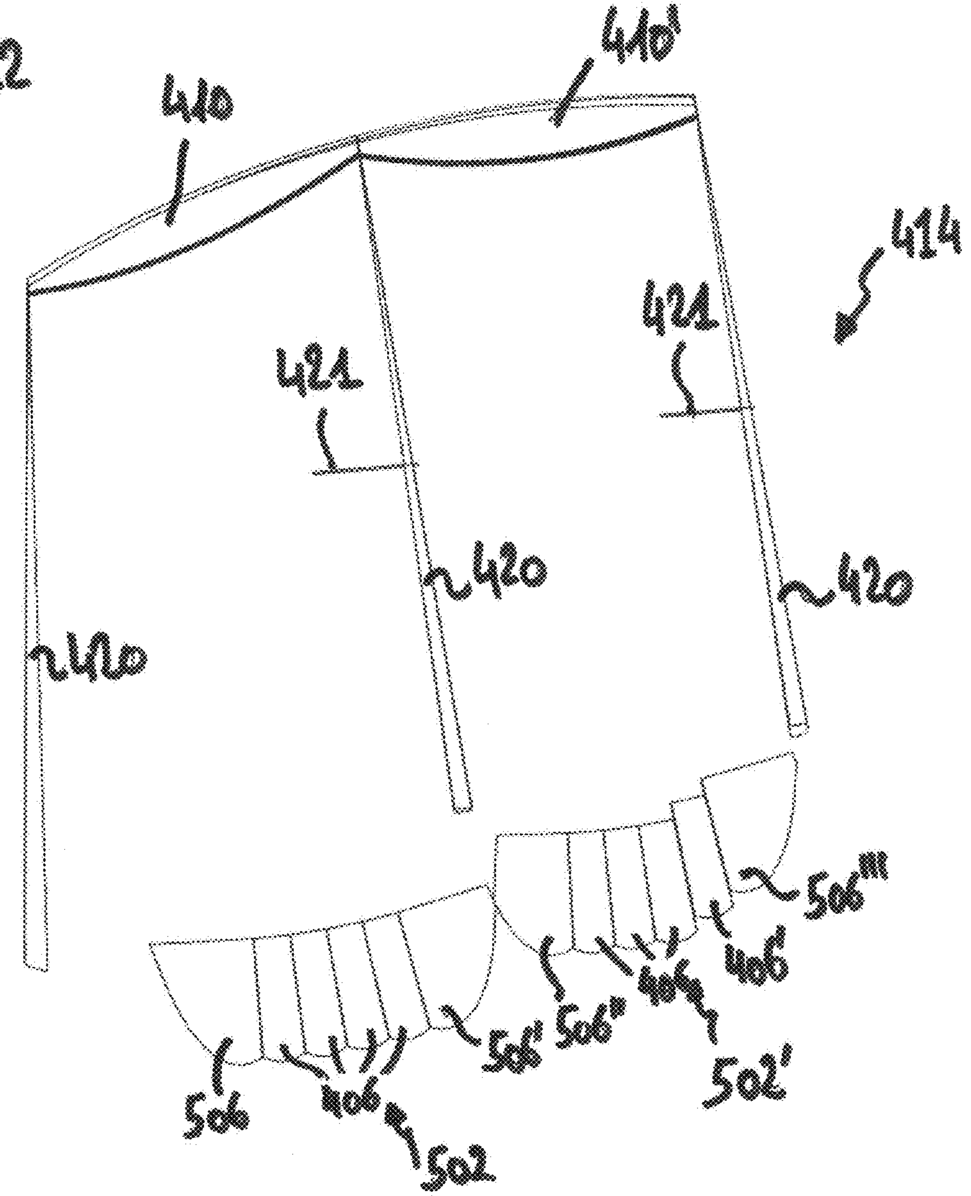
FIG. 22 is a perspective representation of a light device comprising light modules according to the invention, according to a fourth embodiment of the invention.

FIG. 22 illustrates a light device for a motor vehicle according to a fourth embodiment.

FIG. 22 is a view from above of the light device. The light device 414 comprises a plurality of light modules in accordance with the invention which, combined, form a segmented high-beam lighting beam, with lateral light segments, seen on a screen, in the shape of a boat sail and central segments in the shape of vertical strips.

More specifically, the light device 414 comprises a first subset 502 of six light modules. The four central modules are similar to that of FIGS. 9 to 11, that is to say a module with vertical cutoffs. However, their vertical orientation is reversed with respect to those of the third embodiment since most of the light from a beam of high-beam type is above the horizontal. The collectors 406 therefore have their cavity oriented upward according to the viewing angle of FIG. 22. The function of these central modules is to form the central segments of rectangular shape of the segmented high beam. The end modules are similar to that of FIGS. 1 to 4, one side of the collector of which has been truncated or is similar to that of FIGS. 9 to 11, and one side of which has been extended into a shell. Again, the vertical orientation is rotated 180°, such that the collectors 506, 506' are viewed from above.

The function of these lateral modules is to form the lateral end segments of the segmented high beam, which have a sail shape. The light sources have not been shown for the sake of simplicity. It should be noted that the collectors 406, 506, 506' have here been constructed and positioned side by side by circular repetition, the optical focal points of the collectors being on a circular arc, with the surface extensions described above for the lateral collectors 506, 506'.

The light device 314 also comprises a second subset with six light modules that is similar to the first subset. It will be noticed, however, that two end collectors, a central collector 406' adjacent to the right lateral collector 506'", are successively forwardly offset with respect to the optical focal points of the other collectors 506" and 406 further to the left of the two previous ones. In other words, there are steps between the collectors. This configuration advantageously makes it possible to decrease optical aberrations at the level of the cutoffs and to obtain light segments whose vertical cutoffs are as vertical as possible, when projected on a screen. Depending on the needs, a person skilled in the art will be able to create different configurations of modules whose collectors are offset with steps, for example all successively in one direction, or even by offsetting the end collectors with respect to the central collectors.

The beams of the subsets 502, 502' are superposed so as to generate a segmented high beam.

A partition 420 may be provided between the first subset 502 and the second subset 502', so as to allow them to be brought closer together without the light rays escaping from one of the subsets interfering with the other. Such a partition 420 extends essentially vertically when the lighting device is in the mounted position as illustrated. It is advantageously light absorbent.

In addition, a screen 421 is advantageously placed between the collectors and the projecting lens. This makes it possible to intercept parasitic rays coming from the end collectors 506' and 506'" and to improve the sharpness of the lateral segment.

In general, it is advantageous to note that for the different embodiments of the light module and of the light device, different optical projecting systems are envisageable as long as they are able to image the lit reflective surface of the collector in question. In the case of a set of mirrors as described above with reference to FIGS. 16-19, the first mirror and/or the second mirror may be made in one piece with the associated collector, which is advantageous in terms of the relative positioning of these elements.

Figure 23:
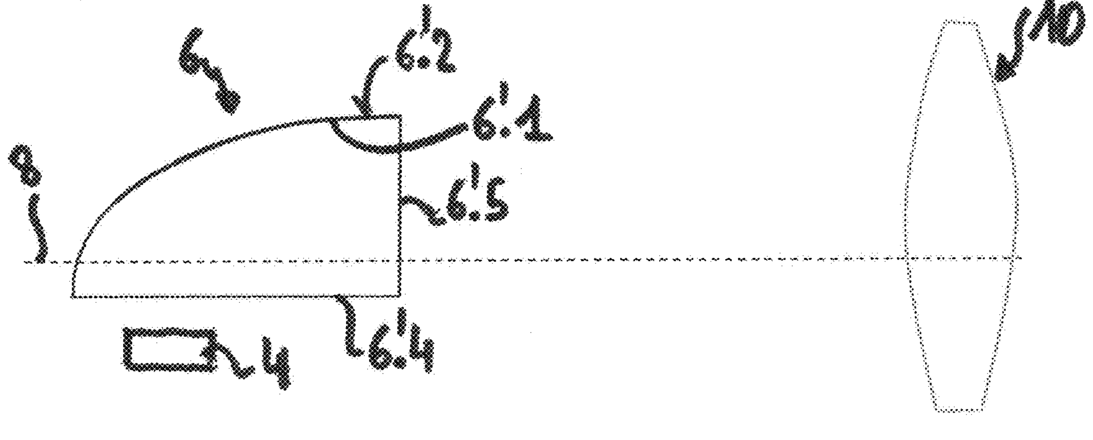
FIG. 23 is a side view of one variant embodiment of the collector of the light module according to the invention.

FIG. 23 illustrates one variant embodiment of the collector. According to this variant, the collector 6 may be made as a solid dioptric part, made of synthetic polymer such as polycarbonate, polymethyl methacrylate, of glass or of silicone. This solid dioptric part comprises an entrance face 6'.4 for the rays emitted by the light source 4, an exit face 6'.5, and a reflection face 6'.1 in the form of a cap which is metallized in order to create the reflective surface 6'.2 according to the invention.

Furthermore, although the light modules of the invention have been described here so as to form light devices for producing lighting beams such as a low beam, high beam or segmented high beam of linear-array type with parallel vertical strips, it goes without saying that these modules could be designed so as to perform signaling functions such as direction indicator, daytime running light, or position light, which will have the esthetic advantage of having a light device containing a plurality of modules that are esthetically similar when they are off and capable of performing a multitude or even all of the regulatory motor vehicle lighting and signaling functions at the front of a motor vehicle. It is thus possible to associate a first light device producing a low beam and another producing a, potentially segmented, high beam within one and the same motor vehicle headlamp.

Still generally, it is advantageous to note the numerous advantages of the light modules and of the light device according to the invention, namely essentially the fact of imaging the lit reflective surface of the collector, under Gaussian conditions, makes it possible to obtain a sharp light image and hence, to produce cutoffs of various and varied shapes by shaping the corresponding edges of the reflective surface in question. Another noteworthy advantage results from the fact that Gaussian conditions are present so as to obtain a minimum level of sharpness, namely that the collector is limited in size, in particular in height, such as for example less than 30 mm. Yet another noteworthy advantage also results from the fact that Gaussian conditions are present, namely that the projecting lens may advantageously be a thin lens, for example less than 6 mm, which allows it to be produced in a single plastic injection without shrink-mark problems. The thin lens has the other advantages of requiring a shorter injection cycle time, of leading to a decrease in the weight of the optical modules, and of generating little or no chromatic aberration, allowing the use of ordinary-quality synthetic polymer materials which are inexpensive with respect to materials of high optical quality which generate few chromatic defects.

Lastly, the fact that the lens is thin makes it possible to envisage one particular embodiment in which the shell of the collector 6 and the projecting lens 10 are made by injection-molding a single part, a bridge of material connecting the front end of the collector and lens.

The invention claimed is:

1. A light module for a motor vehicle, comprising:

a light source capable of emitting light rays;

a collector with a reflective surface configured to collect and reflect the light rays emitted by the light source as a distribution of light points of varying intensities and reflect the light rays emitted by the light source into a light beam along an optical axis of the module;

an optical system configured to project the light bean;

wherein the optical system is configured to form an image of the distribution of the light points of varying intensities collected directly from the reflective surface of the collector, and wherein the optical system has a focal point located on the optical axis, the focal point being behind said light source and in front of a rear part of the collector with respect to a general direction of propagation of the light beam along the optical axis.

2. The light module as claimed in claim 1, wherein the collector is configured so that the light rays reflected from a rear portion of the reflective surface of said collector are parallel to the optical axis or have an angle of inclination (a) smaller than or equal to 25°, in a vertical plane with respect to said axis.

3. The light module as claimed in claim 1, wherein the light source is configured to emit the light rays in a main direction between 65° and 115° with respect to the optical axis.

4. The light module as claimed in claim 1, wherein the reflective surface of the collector has a parabolic or elliptical profile.

5. The light module as claimed in claim 1, wherein said module further comprises a screen located in front of the light source, with respect to a general direction of propagation of the light beam along the optical axis, and facing the reflective surface of the collector, so as to collect the light rays emitted forward by the light source and not reflected by said surface.

6. The light module as claimed in claim 5, wherein the screen is opaque so as to absorb the collected light rays.

7. The light module as claimed in claim 1, wherein the optical system is a projecting lens.

8. The light module as claimed in claim 1, wherein the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position.

9. The light module as claimed in claim 8, wherein the light rays reflected by the reflective surface along the rear edge are parallel to the optical axis or have an angle of inclination smaller than or equal to 25% in a vertical plane with respect to said axis.

10. The light module as claimed in claim 8, wherein the reflective surface of the collector comprises two lateral edges on either side of the optical axis and in the continuation of the rear edge, said lateral edges being in a horizontal plane when the module is oriented in the mounted position.

11. The light module as claimed in claim 10, wherein the rear edge is in the horizontal plane, the light image formed having a corresponding flat horizontal cutoff.

12. The light module as claimed in claim 10, wherein the rear edge has a kink, the light image formed having a corresponding kinked horizontal cutoff.

13. The light module as claimed in claim 8, wherein the reflective surface of the collector comprises two lateral edges on either side of the optical axis, said lateral edges intersecting with the rear edge, the light image formed having corresponding lateral cutoffs.

14. A light device for a motor vehicle, comprising a plurality of light modules combined so as to form, together, a lighting or signaling beam; wherein at least one of the light modules is as claimed in claim 1.

15. The light device as claimed in claim 14, wherein:

for at least one of the light modules, the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position, for at least one other of said modules, the light rays reflected by the reflective surface along the rear edge are parallel to the optical axis or have an angle of inclination (c) smaller than or equal to 25° in a vertical plane with respect to said axis, and the rear edge of the collector of the at least one of the light modules has a kink such that the lighting beam has a kinked horizontal cutoff.

16. The light device as claimed in claim 15, wherein for at least two of the modules the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position, and the optical system is a same optical system for each of said at least two modules.

17. The light device as claimed in claim 16, wherein the common optical system has a focal point line located behind, with respect to a general direction of propagation of the light beam, the collectors of the light modules that number at least two.

18. A light module for a motor vehicle, comprising:

a light source capable of emitting light rays;

a collector with a reflective surface configured to collect and reflect the light rays emitted by the light source as a distribution of light points of varying intensities and reflect the light rays emitted by the light source into a light beam along an optical axis of the module;

an optical system configured to project the light beam;

wherein the optical system is configured to form an image of the distribution of the light points of varying intensities collected directly from the reflective surface of the collector, wherein the reflective surface is elliptical, and wherein the light source is arranged at a first focal point of the reflective surface, and a second focal point of the reflective surface is disposed in a vicinity of the optical system.

19. The light module as claimed in to claim 18, wherein the second focal point of the reflective surface is in front of or behind the optical system and at a distance from or along the optical axis.

20. The light module as claimed in claim 18, wherein the collector is configured so that the light rays reflected from a rear portion of the reflective surface of said collector are parallel to the optical axis or have an angle of inclination smaller than or equal to 25° in a vertical plane with respect to said axis.

21. The light module as claimed in claim 18, wherein the light source is configured to emit the light rays in a main direction between 65° and 115° with respect to the optical axis.

22. The light module as claimed in claim 18, wherein the optical system has a focal point located on the optical axis at the level of the light source, in front of or behind said light source with respect to a general direction of propagation of the light beam along the optical axis.

23. The light module as claimed in claim 18, wherein said module further comprises a screen located in front of the light source, with respect to a general direction of propagation of the light beam along the optical axis, and facing the reflective surface of the collector, so as to collect the light rays emitted forward by the light source and not reflected by said surface.

24. The light module as claimed in claim 23, wherein the screen is opaque so as to absorb the collected light rays.

25. The light module as claimed in claim 18, wherein the optical system is a projecting lens.

26. The light module as claimed in claim 18, wherein the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position.

27. The light module as claimed in claim 26, wherein the light rays reflected by the reflective surface along the rear edge are parallel to the optical axis or have an angle of inclination smaller than or equal to 25° in a vertical plane with respect to said axis.

28. The light module as claimed in claim 26, wherein the reflective surface of the collector comprises two lateral edges on either side of the optical axis and in the continuation of the rear edge, said lateral edges being in a horizontal plane when the module is oriented in the mounted position.

29. The light module as claimed in claim 28, wherein the rear edge is in the horizontal plane, the light image formed having a corresponding flat horizontal cutoff.

30. The light module as claimed in claim 28, wherein the rear edge has a kink, the light image formed having a corresponding kinked horizontal cutoff.

31. The light module as claimed in claim 26, wherein the reflective surface of the collector comprises two lateral edges on either side of the optical axis, said lateral edges intersecting with the rear edge, the light image formed having corresponding lateral cutoffs.

32. A light device for a motor vehicle, comprising a plurality of light modules combined so as to form, together, a lighting or signaling beam; wherein at least one of the light modules is as claimed in claim 18.

33. The light device as claimed in claim 32, wherein:

for at least one of the light modules, the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position, for at least one other of said modules, the light rays reflected by the reflective surface along the rear edge are parallel to the optical axis or have an angle of inclination smaller than or equal to 25° in a vertical plane with respect to said axis, and the rear edge of the collector of the at least one of the light modules has a kink such that the lighting beam has a kinked horizontal cutoff.

34. The light device as claimed in claim 33, wherein for at least two of the modules the reflective surface of the collector is concave and has a front edge and a rear edge, with respect to a general direction of propagation of the light beam, said front edge delimiting a lower portion of the light image formed and said rear edge delimiting an upper portion of said image, when the module is oriented in the mounted position, and the optical system is a same optical system for each of said at least two modules.

35. The light device as claimed in claim 34, wherein the common optical system has a focal point line located behind, with respect to a general direction of propagation of the light beam, the collectors of the light modules that number at least two.

* * * * *